United States Patent
Marukawa et al.

(10) Patent No.: US 6,858,344 B2
(45) Date of Patent: Feb. 22, 2005

(54) PRISMATIC BATTERY HAVING COOLING STRUCTURE AND BATTERY PACK USING THE SAME

(75) Inventors: Shuhei Marukawa, Toyohashi (JP); Ko Watanabe, Toyohashi (JP); Toyohiko Eto, Toyota (JP)

(73) Assignees: Matsushita Electric Industrial Co., Ltd., Osaka (JP); Toyota Jidosha Kabushiki Kaisha, Aichi (JP)

(*) Notice: Subject to any disclaimer, the term of this patent is extended or adjusted under 35 U.S.C. 154(b) by 245 days.

(21) Appl. No.: 10/196,373

(22) Filed: Jul. 17, 2002

(65) Prior Publication Data

US 2003/0017384 A1 Jan. 23, 2003

(30) Foreign Application Priority Data

Jul. 19, 2001 (JP) ........................... 2001-219575

(51) Int. Cl.[7] .................................... H01M 2/00
(52) U.S. Cl. ................... 429/148; 429/142; 429/163
(58) Field of Search ............................. 429/142, 148, 429/163

(56) References Cited

U.S. PATENT DOCUMENTS

| | | | |
|---|---|---|---|
| 5,162,171 A | 11/1992 | Jones | 429/101 |
| 5,492,779 A | 2/1996 | Ronning | 429/120 |
| 5,756,227 A | 5/1998 | Suzuki et al. | |
| 5,879,831 A * | 3/1999 | Ovshinsky et al. | 429/54 |
| 6,689,510 B1 * | 2/2004 | Gow et al. | 429/149 |

FOREIGN PATENT DOCUMENTS

| | | | |
|---|---|---|---|
| EP | 0490597 | 6/1992 | |
| EP | 0881696 | 12/1998 | |
| EP | 1117138 | 7/2001 | |
| FR | 1460614 | 3/1996 | |
| FR | 2742002 | 6/1997 | |
| JP | 63-261681 | 10/1988 | |
| JP | 7-14616 | 1/1995 | |
| JP | 8-148187 | 6/1996 | |
| JP | 10-246112 | * 9/1998 | ............ F01P/5/06 |
| JP | 2002-334684 | 11/2002 | |

OTHER PUBLICATIONS

English Language Abstract of JP 8–148187.
English Language Abstract of JP 2002–334684.
English Language Abstract of JP 63–261681.
English Language Abstract of JP 8–148187.
English Language Abstract EPO Appln. No. 0881696.
English Language Abstract of FR Appln. No. 2742002.
English Language Abstract of JP Appln. No. 7–14616.

* cited by examiner

Primary Examiner—Dah-Wei Yuan
(74) Attorney, Agent, or Firm—Greenblum & Bernstein, P.L.C.

(57) ABSTRACT

A battery pack includes a plurality of prismatic batteries including an electrode plate group and electrolyte housed in a prismatic battery case and being arranged in parallel and integrally bound. A metal plate is integrally embedded in the sidewall of the prismatic battery which is in parallel with the electrode plate group. A heat transfer part protruding from the prismatic battery case is provided at least one side of the metal plate. A heat exchanger is provided such that a heat exchanging surface of the heat exchanger is brought into contact with the heat transfer part protruding from the prismatic battery case of the prismatic battery. Then, the battery pack and the heat exchanger are fixed.

20 Claims, 5 Drawing Sheets

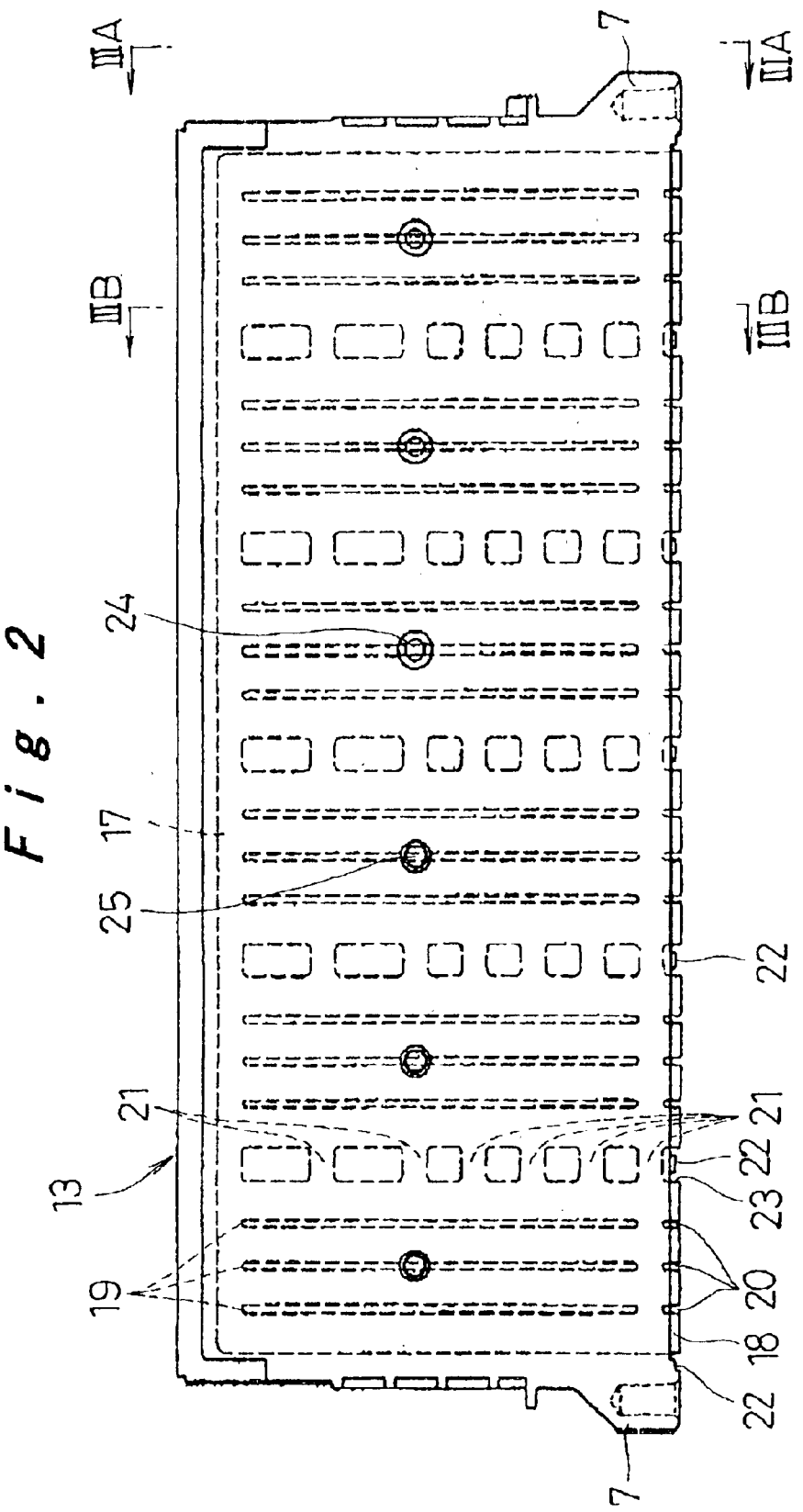

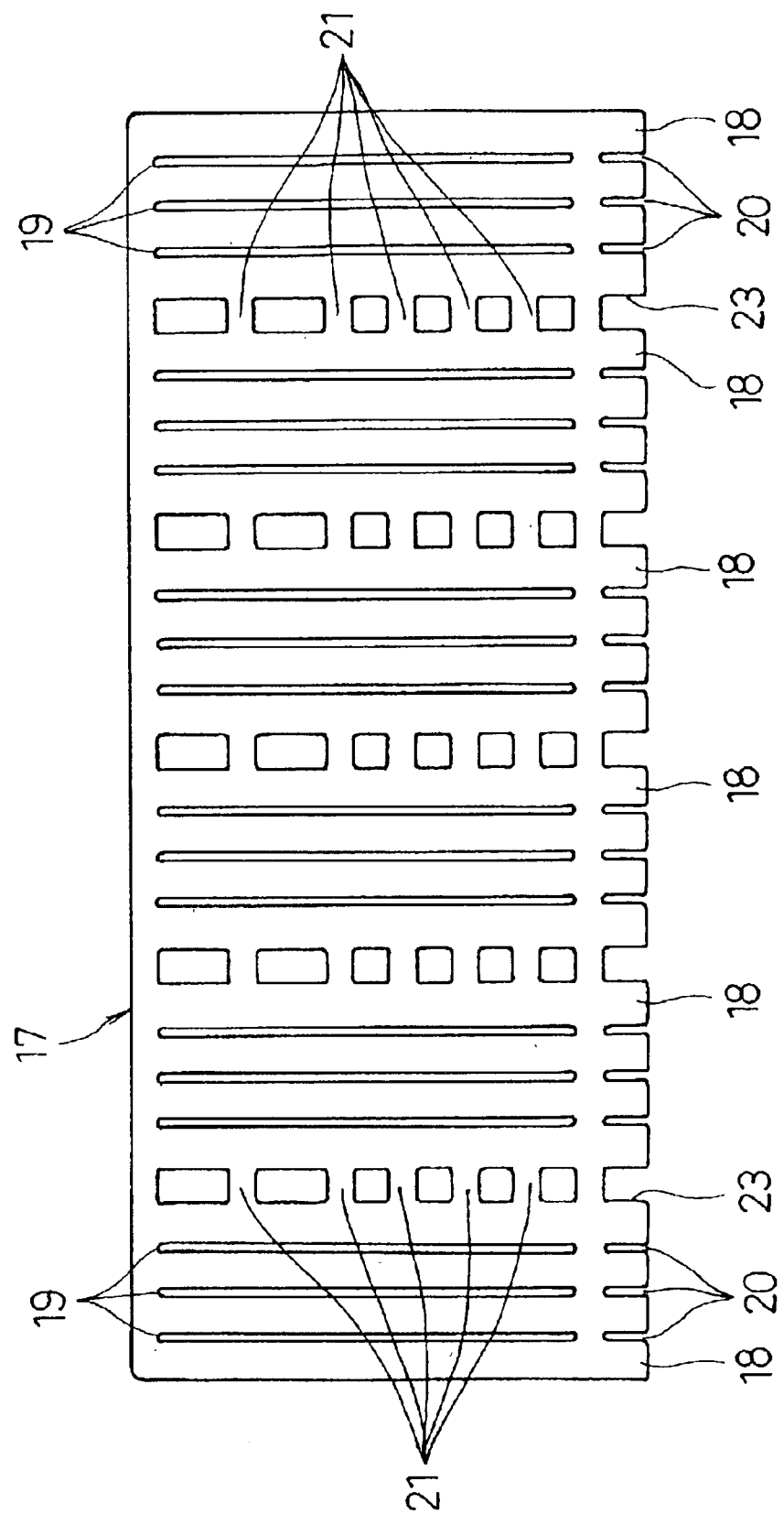

PRISMATIC BATTERY HAVING COOLING STRUCTURE AND BATTERY PACK USING THE SAME

The present disclosure relates to subject matter contained in priority Japanese Patent Application No. 2001-219575, filed on Jul. 19, 2001, the contents of which is herein expressly incorporated by reference in its entirety.

BACKGROUND OF THE INVENTION

1. Field of the Invention

The present invention relates to a prismatic battery having a cooling structure and a battery pack using the same, and more particularly to a prismatic battery and a battery pack in which each of the prismatic batteries are equally cooled when the battery pack is constituted such that the plurality of prismatic batteries are arranged in parallel and integrally bound together.

2. Description of Related Art

As a method for cooling a battery pack in which a plurality of prismatic batteries are arranged in parallel and integrally bound, it is known that the plurality of prismatic batteries are integrally bound while passages for a cooling medium are provided between them so that each prismatic battery is directly cooled by distributing the cooling medium through the passages. However, there is a problem that it is difficult to distribute the cooling medium equally through the respective passages.

Thus, as disclosed in Japanese Laid-open Patent Publication No. 8-148187, there is proposed an indirect cooling method in which a heat transfer plate is arranged between the plurality of prismatic batteries so as to be in contact with the prismatic batteries arranged in parallel and the heat transfer plate is cooled by a heat exchanger or the like.

Description will be made referring to FIG. 5. A plurality (ten in the drawing) of prismatic batteries 32 are arranged in parallel. A heat transfer plate 33 the cross section of which is T shape or L shape has a first heat transfer face 33a and a second heat transfer face 33b arranged at right angle to the first heat transfer face. The first heat transfer face 33a of the heat transfer plate 33 is inserted between the prismatic batteries 32 and 32 and the prismatic batteries 32 are bound together by end plates 34 provided at both ends thereof and fixed by binding bands 35 and thus, a battery pack 31 is provided. Each prismatic battery 32 is cooled by facing the second heat transfer face 33b of the heat transfer plate 33 to one side face of the battery pack 31 and bringing the second heat transfer face 33b into contact with a heat transfer face of a heat exchanger or with a cooling medium.

However, there is a problem in the above-mentioned structure for cooling the battery pack. That is, a binding force of the battery pack 31 integrally bound by the end plate 34 and the binding band 35 is reduced in accordance with creep deformation of the battery case of each prismatic battery 32 occurring with the lapse of time. Consequently, the contact between the heat transfer plate 33 and the battery case of the prismatic battery 32 becomes unstable, which generates imperfect contact points between the heat transfer plate 33 and the battery case of the prismatic battery 32. Since the efficiency of heat transfer is immediately lowered at the imperfect contact points, the cooling capability is substantially lowered overall and the temperature of the prismatic batteries varies widely. Thus, there is not provided sufficient long-term reliability.

In addition, when the prismatic batteries are cooled by bringing the second heat transfer face 33b of the heat transfer plate 33 into contact with the heat transfer face of the heat exchanger, the contact is not sufficiently secured because of camber of the heat exchanger or variation in disposed position and dimension of the prismatic batteries. Accordingly, there is a disadvantage that the cooling capability is not stable.

SUMMARY OF THE INVENTION

The present invention was made in light of the above-mentioned problems and it is an object of the present invention to provide a prismatic battery having a cooling structure and a battery pack in which high cooling capability for the prismatic battery is stably obtained and each prismatic battery of the battery pack is equally cooled with high reliability for a long time.

A prismatic battery according to the present invention includes an electrode plate group and electrolyte housed in a prismatic battery case. A metal plate is integrally embedded in a sidewall of the battery case which is in parallel with the electrode plate group therein. A heat transfer part protruding from the battery case is provided at least one side of the metal plate. When the heat transfer part protruding from the battery case is cooled by proper cooling means, cold is transferred through the metal plate so that the whole battery case is equally cooled. In addition, since the metal plate is integrally embedded in the battery case, the reliability of the cooling capability is highly maintained for a long time.

Furthermore, in a cooling structure of a battery pack according to the present invention, the above-mentioned prismatic batteries are arranged in parallel and integrally bound to form the battery pack and the heat exchanger is provided such that a heat exchanging surface of the heat exchanger is brought into contact with the heat transfer part protruding from the battery case of the prismatic battery, and then, the battery pack and the heat exchanger are fixed with each other. Accordingly, the heat is transferred from the heat transfer part to the heat exchanging surface of the heat exchanger by a simple structure and each of the prismatic batteries is uniformly and effectively cooled by the heat exchanger.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 2 is a front view showing a prismatic battery according to the embodiment of the invention;

FIGS. 3A to 3C show a detailed structure of the prismatic battery according to the embodiment, in which FIG. 3A is a side view in the direction of the arrow IIIA—IIIA in FIG. 2, FIG. 3B is a sectional view taken along the arrow IIIB—IIIB in FIG. 2, and FIG. 3C is an enlarged view of a portion IIIC of FIG. 3B;

FIG. 4 is a front view showing a metal plate embedded in the battery case according to the embodiment.

DETAILED DESCRIPTION OF THE PREFERRED EMBODIMENTS

A cooling structure of a battery pack according to one embodiment of the present invention will be described hereinafter referring to FIG. 1 to FIG. 4.

Figure 1:
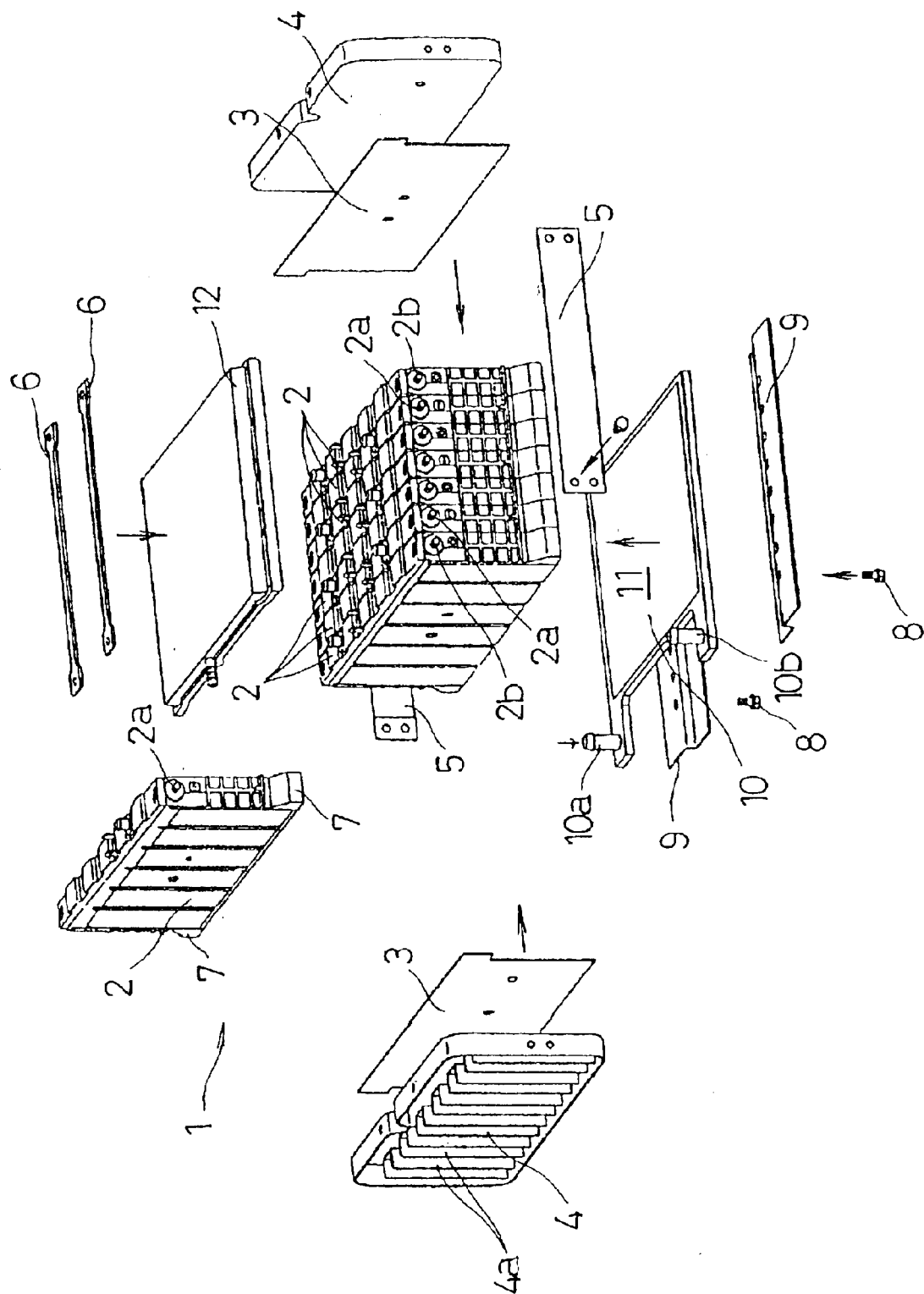
FIG. 1 is an exploded perspective view showing a cooling structure of a battery pack according to one embodiment of the present invention.

In FIG. 1, a battery pack 1 of the embodiment is constituted so as to be suitably used as a driving power source for an electric vehicle, in which a plurality (eight in the drawing) of prismatic batteries 2 that are nickel-metal hydride rechargeable batteries are arranged in parallel and connected electrically in series.

End plates 4 having reinforcing ribs 4a are disposed at both ends of the prismatic batteries in its parallel direction with an insulating plate 3 interposed between each plate 4 and the battery. Both side ends of the end plates 4 are tightly fixed to each other by binding straps 5, and upper ends of the end plates 4 are tightly fixed to each other by binding straps 6, respectively. A pair of legs 7 protrude from the both lower side ends of the prismatic battery 2, and the legs 7 of the arranged prismatic batteries are fixed to a pair of mounting plates 9 by mounting bolts 8. As a result, the prismatic batteries 2 are tightly fixed and integrated as the battery pack 1.

Connecting terminals 2a and 2b of positive and negative electrodes, respectively protrude from both upper side ends of each prismatic battery 2 and the prismatic batteries 2 are arranged in parallel in such a manner that the positive and negative electrodes are alternately disposed in the opposite direction in the battery pack 1. The prismatic batteries 2 are electrically connected in series by connecting the connecting terminals 2a and 2b on one side of the battery pack 1 with a first connecting module (not shown) and by connecting the connecting terminals 2a and 2b on the other side of the battery pack 1 with a second connecting module (not shown).

A heat exchanger 10 in which a cooling medium such as cooling water is circulated is provided at the lower face of the battery pack 1 and both sides thereof are supported by the pair of mounting plates 9. A flat heat exchanging surface 11 is formed on the upper surface of the heat exchanger 10 so as to be in contact with the lower face of each prismatic battery case 13 to cool each of the prismatic batteries 2. Reference numeral 10a designates an inlet of the cooling medium and reference numeral 10b designates an outlet of the cooling medium. A top cover 12 for scavenging hydrogen gas discharged from a safety vent provided on each prismatic battery 2 is installed at the upper face of the battery pack 1.

Figure 3A:
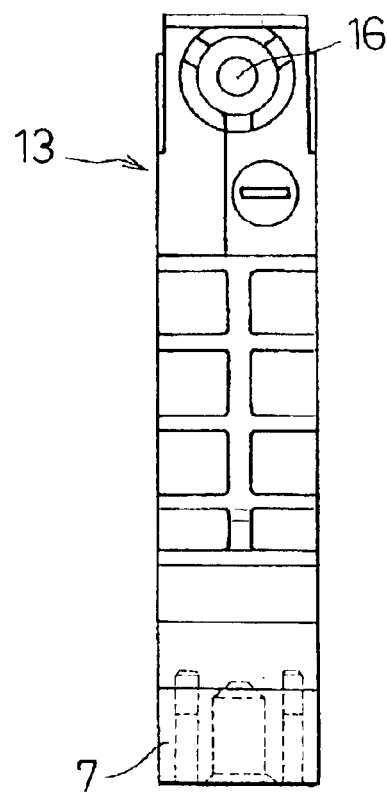
Figure 3B:
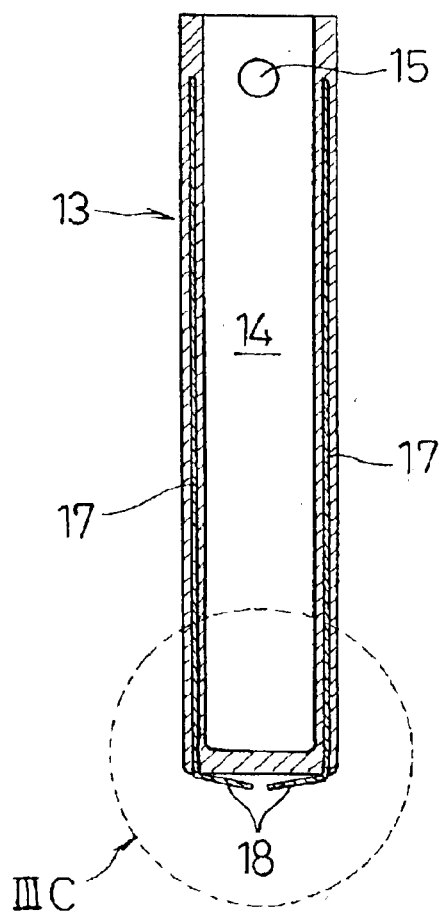
Figure 3C:
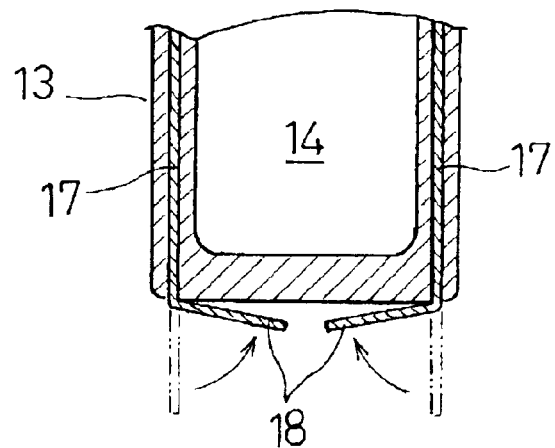
Figure 5:
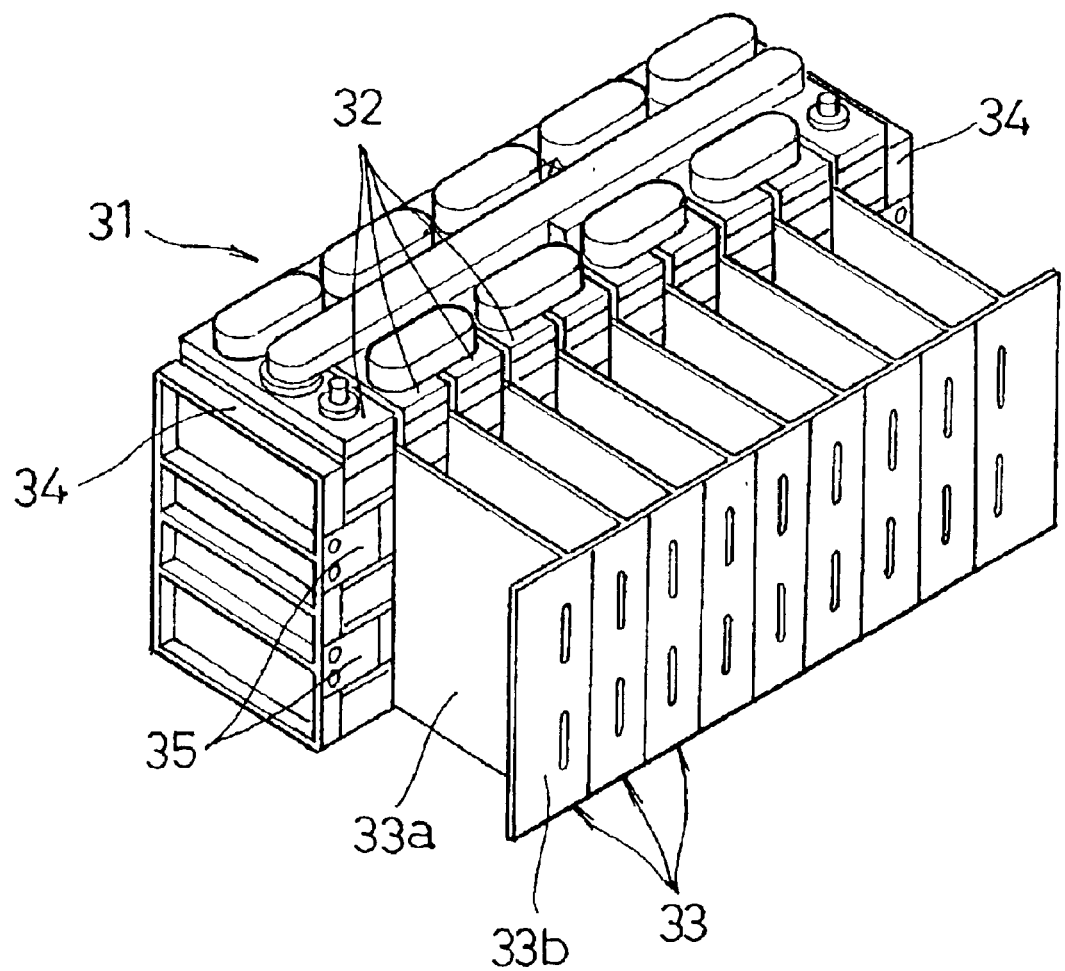
FIG. 5 is an exploded perspective view showing a conventional cooling structure of a battery pack.

As shown in FIG. 2 to FIG. 3C, a prismatic battery case 13 is provided in the prismatic battery 2. In this battery case 13, a plurality (six in this embodiment) of prismatic cell cases 14 each having short and long side faces are integrally connected with the respective short side faces being shared as a partition wall. A cell is constituted such that the cell case 14 houses electrolyte and an electrode plate group of many positive and negative electrode plates which are in parallel with the long side face of the case 14 and stacked in a direction of the short side face thereof with separators interposed therebetween. The prismatic battery 2 is constituted such that six cells are connected in series in the prismatic battery case 13 and an upper opening of the prismatic battery case 13 is sealed with a cover (not shown in FIG. 2 to FIG. 3C) having a safety vent. In FIG. 3A and FIG. 3B, reference numeral 15 designates a connecting hole between the cells and reference numeral 16 designates an installing hole for the connecting terminals 2a and 2b.

In the prismatic battery case 13, a metal plate 17 which is formed of a metal having a high heat conductivity such as aluminum and acts as the heat transfer plate is integrally embedded by insert molding in each of sidewalls of the case 13 which correspond to the long side face of the cell case 14.

The lower end of the metal plate 17 protrudes from the lower end of the prismatic battery case 13 as shown by a virtual line in FIG. 3C and inwardly bent as shown in FIG. 3B and FIG. 3C. Thus, a heat transfer part 18 having a spring property is provided.

As shown in FIG. 2 and FIG. 4, a plurality of slits 19 extending in the far-and-near direction with respect to the heat transfer part 18 (namely, vertical direction in the embodiment) are formed in the metal plate 17 for each cell case 14, and also slits 20 are formed in the heat transfer part 18 at proper intervals. In the metal plate 17, the slits 19 are not formed between the adjacent cell cases 14 and 14, and connecting parts 21 for transferring heat are provided at proper intervals in the vertical direction so as to prevent the variation in temperature between the cell cases 14. The connecting parts 21 are disposed at narrower intervals at the lower part near the heat transfer part 18 than at the upper part thereof so that a large amount of heat transfer is allowed at the lower part.

In addition, at the lower end of the prismatic battery case 13 from which the heat transfer part 18 protrudes, a projection 22 for controlling an amount of deformation of the heat transfer part 18 by abutting on the heat exchanging surface 11 of the heat exchanger 10 is provided at positions between the adjacent cell cases 14. A cutout 23 is formed in the heat transfer part 18 so as to avoid interference with the projection 22.

Reference numerals 24 and 25 designate positioning convexity and concavity, respectively. They are symmetrically provided about the center line in the longitudinal direction on the long side outer surface of the prismatic battery case 13. The convexity and concavity are engaged with those of the adjacent prismatic batteries 2 so as to be mutually positioned when the prismatic batteries 2 are alternately disposed in the opposite direction.

According to the battery pack 1 constituted as above, since the heat transfer part 18 of the prismatic battery 2 is pressed against the heat exchanging surface 11 of the heat exchanger 10, cold is transferred through the metal plate 17 having a high heat conductivity so that the whole of the prismatic battery case 13 of the prismatic battery 2 is equally and effectively cooled. Furthermore, since the metal plate 17 is integrally embedded in the prismatic battery case 13, the reliability of the cooling capability is maintained for a long time.

Furthermore, the plurality of slits 19 extending in the far-and-near direction with respect to the heat transfer part 18 are provided in the metal plate 17 at each position corresponding to each cell case 14. Thus, even though the metal plate 17 is embedded in each of the sidewalls of the prismatic battery case 13, the rigidity of the sidewall is prevented from increasing. Consequently, when the expansion or contraction of the cell case 14 is caused by a change in the internal pressure of each of the cells of the prismatic battery 2, the cell case 14 is prevented from being kept in the expanding state due to the plastic deformation of the metal plate 17 at the time of expansion of the cell case 14.

Since the heat transfer part 18 is bent so as to have a spring property, the heat transfer part 18 is elastically pressed against the heat exchanging surface 11 by simply pressing the heat exchanging surface 11 of the heat exchanger 10 to the heat transfer part 18, whereby a high cooling capability is secured. In addition, since the slits 20 are formed in the heat transfer part 18 at proper intervals, the heat transfer part 18 easily follows the deformation such as the dimension error or the camber of the heat exchanger 10 or variation in disposed position or in dimension of the prismatic battery 2. Thereby, the whole of the heat transfer part 18 is surely brought into contact with the heat exchanging surface 11 and high heat transferring capability is secured.

Furthermore, since the connecting parts 21 for transferring heat are provided at each position corresponding to a portion between the adjacent cell cases 14 and 14 of the prismatic battery case 13 so as to transfer the heat through the connecting parts 21, the variation in temperature between the cell cases 14 is prevented. Further, the connecting parts 21 are provided more at the part near the heat transfer part 18 (the lower part) than at the far part (the upper part). Thus, the amount of heat transfer between the cell cases 14 and 14 is increased in accordance with the fact that the amount of heat transfer is larger in the proximity of the heat transfer part 18, whereby the variation in temperature is surely prevented between the cell cases 14 and 14.

Furthermore, the projection 22 for controlling the amount of deformation of the heat transfer part 18 by abutting on the heat exchanging surface 11 of the heat exchanger 10 is provided at the lower end of the prismatic case 13 from which the heat transfer part 18 protrudes. Thus, the appropriate contact is not interfered by the excessive deformation of the heat transfer part 18 even when the heat exchanging surface 11 cambers, whereby the heat is effectively transferred from the heat transfer part 18 to the heat exchanging surface 11 so that the reliability for the cooling capability is highly improved.

In the above description of the embodiment, the heat transfer part 18 of the prismatic battery 2 is simply pressed against the heat exchanging surface 11 of the heat exchanger 10. The present invention is not limited thereto, and if a heat transfer medium having high efficiency of heat transfer such as a gel material is disposed around the contact part between the heat transfer part 18 and the heat exchanger 11, the efficiency of heat transfer between the heat transfer part 18 and the heat exchanger 11 is further improved so that the cooling capability is improved. In addition, if the heat exchanging surface 11 is formed to a concavo-convex shape such as a corrugated plate, the contact surface between the heat transfer part 18 and the heat exchanging surface 11 is enlarged, whereby the efficiency of heat transfer and the cooling capability is improved. Thus, when these are used together, the cooling capability is further improved.

According to the prismatic battery of the invention, the whole of the battery case is equally cooled by cooling the heat transfer part protruding from the battery case using proper cooling means. Furthermore, since the metal plate is integrally embedded in the battery case, the reliability for the cooling capability is highly maintained for a long time.

According to the cooling structure in the battery pack of the invention, the heat is transferred from the heat transfer part to the heat exchanging surface of the heat exchanger using a simple structure and each of the prismatic batteries in the battery pack is uniformly and effectively cooled by the heat exchanger.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A prismatic battery comprising:
   an electrode plate group;
   an electrolyte; and
   a prismatic battery case that houses the electrode plate group and the electrolyte, wherein
   a metal plate is integrally embedded in a sidewall of the prismatic battery case, the sidewall being parallel to the electrode plate group, and
   a heat transfer part protruding from the prismatic battery case being positioned on at least one side of the metal plate.

2. The prismatic battery according to claim 1, wherein the metal plate is provided with a slit that extends into the heat transfer part.

3. The prismatic battery according to claim 1, wherein the heat transfer part of the metal plate includes a bend.

4. The prismatic battery according to claim 3, wherein slits are provided in the heat transfer part.

5. The prismatic battery according to claim 1, wherein
   the prismatic battery case comprises a plurality of prismatic cell cases, each cell case including long and short sidewalls, the cells being integrally connected so as to share the short sidewalls as a partition wall,
   the heat transfer part of the metal plate protrudes in a direction crossing at a right angle to a direction of connection of the cells,
   a slit provided in the metal plate for each cell case, the slit extending into the heat transfer part, and
   a connecting part that transfers heat provided in the metal plate at each position corresponding to a portion between the cell cases.

6. The prismatic battery according to claim 5, wherein
   a plurality of the connecting parts are provided, more of the plurality of connecting parts being provided near the heat transfer part than from the heat transfer part.

7. A battery pack comprising a plurality of the prismatic batteries according to claim 1, the prismatic batteries being arranged in parallel and integrally bound, wherein
   a heat exchanger is provided and is configured such that a heat exchanging surface of the heat exchanger is in contact with the heat transfer part protruding from the battery case of the prismatic battery, the battery pack and the heat exchanger being fixed to each other.

8. The battery pack according to claim 7, wherein
   a projection abutting the heat exchanging surface of the heat exchanger is provided at an end face of the prismatic battery case from which the heat transfer part protrudes.

9. The battery pack according to claim 7, wherein
   a heat transfer medium is provided around a contacting part of the heat transfer part of the prismatic battery and the heat exchanging surface of the heat exchanger.

10. The battery pack according to claim 7, wherein the heat exchanging surface of the heat exchanger comprises a concavo-convex shape.

11. A prismatic battery comprising:
    an electrode plate group;
    an electrolyte;
    a prismatic battery case that houses the electrode plate group and the electrolyte;
    a metal plate provided within a sidewall of the prismatic battery case, the sidewall extending parallel to the electrode plate group, and
    a heat transfer part protruding from the prismatic battery case on at least one side of the metal plate.

12. The prismatic battery according to claim 11, wherein the metal plate is provided with a slit that extends into the heat transfer part.

13. The prismatic battery according to claim 11, wherein the heat transfer part of the metal plate includes a bend.

14. The prismatic battery according to claim 13, wherein slits are provided in the heat transfer part.

15. The prismatic battery according to claim 11, wherein
the prismatic battery case comprises a plurality of prismatic cell cases, each cell case including long and short sidewalls, the cells being connected so as to share the short sidewalls as a partition wall,
the heat transfer part of the metal plate protrudes in a direction transverse to a direction of connection of the cells,
a slit in the metal plate for each cell case, the slit extending into the heat transfer part, and
a connecting part that transfers heat is provided in the metal plate at each position corresponding to a portion between the cell cases.

16. The prismatic battery according to claim 15, wherein a plurality of the connecting parts are provided, more of the plurality of connecting parts being provided near the heat transfer part than far from the heat transfer part.

17. A battery pack comprising a plurality of the prismatic batteries according to claim 11, the prismatic batteries being arranged in parallel and connected, wherein
a heat exchanger is provided and is configured such that a heat exchanging surface of the heat exchanger is in contact with the heat transfer part protruding from the battery case of the prismatic battery, the battery pack and the heat exchanger being fixed to each other.

18. The battery pack according to claim 17, wherein a projection abutting the heat exchanging surface of the heat exchanger is provided at an end face of the prismatic battery case from which the heat transfer part protrudes.

19. The battery pack according to claim 17, wherein a heat transfer medium is provided around a contacting part of the heat transfer part of the prismatic battery and the heat exchanging surface of the heat exchanger.

20. The battery pack according to claim 17, wherein the heat exchanging surface of the heat exchanger comprises a concavo-convex shape.

* * * * *